US012283756B2

(12) United States Patent
Vilenskiy et al.

(10) Patent No.: US 12,283,756 B2
(45) Date of Patent: Apr. 22, 2025

(54) ANTENNA ARRAY ELEMENT WITH DUAL POLARIZATION, ANTENNA ARRAY INCLUDING ANTENNA ARRAY ELEMENT AND ELECTRONIC DEVICE INCLUDING ANTENNA ARRAY

(71) Applicant: Samsung Electronics Co., Ltd., Suwon-si (KR)

(72) Inventors: Artem Rudolfovitch Vilenskiy, Moscow (RU); Elena Aleksandrovna Shepeleva, Moscow (RU); Gennadiy Aleksandrovich Evtyushkin, Moscow (RU); Anton Sergeevich Lukyanov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 18/177,503

(22) Filed: Mar. 2, 2023

(65) Prior Publication Data

US 2024/0195085 A1 Jun. 13, 2024

Related U.S. Application Data

(63) Continuation of application No. PCT/KR2023/002579, filed on Feb. 23, 2023.

(30) Foreign Application Priority Data

Dec. 7, 2022 (RU) ........................... RU2022131923

(51) Int. Cl.
*H01Q 25/00* (2006.01)
*H01Q 21/06* (2006.01)

(52) U.S. Cl.
CPC ......... *H01Q 25/001* (2013.01); *H01Q 21/065* (2013.01)

(58) Field of Classification Search
CPC ........................... H01Q 25/001; H01Q 21/065
See application file for complete search history.

(56) References Cited

U.S. PATENT DOCUMENTS 4,766,440 A 8/1988 Gegan
5,241,322 A 8/1993 Gegan
(Continued)

FOREIGN PATENT DOCUMENTS

AU 2021100119 A4 4/2021
CN 104157982 A 11/2014
(Continued)

OTHER PUBLICATIONS

M. Ouadefli, A. Tribak, M. Et-tolba, J. A. García and H. Tizyi, "Linear Dual-Polarized Microstrip Patch Antenna with U-shaped Aperture," 2022 2nd International Conference on Innovative Research in Applied Science, Engineering and Technology (IRASET), Meknes, Morocco, 2022, pp. 1-4, (Year: 2022).*
(Continued)

*Primary Examiner* — Dieu Hien T Duong
(74) *Attorney, Agent, or Firm* — Jefferson IP Law, LLP

(57) ABSTRACT

An antenna array element with dual polarization is provided. The antenna array element includes a multilayer printed circuit board (PCB), a first patch placed on an inner layer of the multilayer PCB, a second patch placed on an upper layer of the multilayer PCB and coupled by electromagnetic field with the first patch, two U slots placed orthogonally on the multilayer PCB layer under the first patch, feedlines placed on one PCB layer under the U slots orthogonally to each other and configured to excite the U slots, ad a plurality of electromagnetic band gap (EBG) elements located in a boundary area of the antenna array element.

18 Claims, 4 Drawing Sheets

(56) References Cited

U.S. PATENT DOCUMENTS

| | | | | |
|---|---|---|---|---|
| 6,943,735 | B1 * | 9/2005 | Cadotte, Jr. | H01Q 1/38 343/846 |
| 10,819,041 | B1 | 10/2020 | Kee et al. | |
| 11,108,165 | B2 | 8/2021 | Sarabandi et al. | |
| 2015/0295309 | A1 * | 10/2015 | Manry, Jr. | H01Q 3/247 342/374 |
| 2015/0381229 | A1 | 12/2015 | Tzanidis et al. | |
| 2016/0149303 | A1 | 5/2016 | McGough et al. | |
| 2020/0059011 | A1 | 2/2020 | Sarabandi et al. | |
| 2020/0067193 | A1 | 2/2020 | Zhinong et al. | |
| 2020/0373672 | A1 | 11/2020 | Paulotto et al. | |
| 2022/0294124 | A1 * | 9/2022 | Dolatsha | H01Q 1/48 |
| 2022/0407233 | A1 | 12/2022 | Woo | |

FOREIGN PATENT DOCUMENTS

| | | | | |
|---|---|---|---|---|
| CN | 107342458 | A | * 11/2017 | H01Q 1/38 |
| CN | 110112577 | A | 8/2019 | |
| CN | 110797649 | A | 2/2020 | |
| CN | 210245710 | U | 4/2020 | |
| CN | 112332087 | A | 2/2021 | |
| CN | 212626041 | U | 2/2021 | |
| CN | 112864614 | A | 5/2021 | |
| CN | 113300108 | A | 8/2021 | |
| CN | 113422202 | A | 9/2021 | |
| CN | 214227145 | U | 9/2021 | |
| CN | 214227148 | U | 9/2021 | |
| CN | 113540774 | A | 10/2021 | |
| CN | 113991319 | A | 1/2022 | |
| CN | 114122705 | A | 3/2022 | |
| CN | 114122706 | A | 3/2022 | |
| CN | 216450817 | U | 5/2022 | |
| CN | 216566903 | U | 5/2022 | |
| CN | 216773512 | U | 6/2022 | |
| RU | 2 368 040 | C1 | 9/2009 | |
| WO | 2021-085669 | A1 | 5/2021 | |

OTHER PUBLICATIONS

Doganay Dogan, A Wide Band, Dual Polarized Patch Antenna for Wide Angle Scanning Phased Arrays, 2013 IEEE.

International Search Report dated Aug. 30, 2023, issued in International Patent Application No. PCT/KR2023/002579.

Russian Search Report dated Mar. 28, 2023, issued in Russian Patent Application No. 2022131923/28(069633).

* cited by examiner

ANTENNA ARRAY ELEMENT WITH DUAL POLARIZATION, ANTENNA ARRAY INCLUDING ANTENNA ARRAY ELEMENT AND ELECTRONIC DEVICE INCLUDING ANTENNA ARRAY

CROSS-REFERENCE TO RELATED APPLICATIONS

This application is a continuation application, claiming priority under § 365(c), of an international application No. PCT/KR2023/002579, filed on Feb. 23, 2023, which is based on and claims the benefit of a Russian patent application number 2022131923, filed on Dec. 7, 2022, in the Russian Patent Office, the disclosure of which is incorporated by reference herein in its entirety.

TECHNICAL FIELD

The disclosure relates to radio engineering. More particularly, the disclosure relates to a dual polarized wide-scan-angle antenna array.

BACKGROUND OF THE INVENTION

The ever-increasing needs of users motivate rapid development of communication technologies. Advanced 5th generation (5G) and 6th generation (6G) communication networks, which will feature higher performance characteristics such as high transmission rate and energy efficiency, are currently under active development.

New applications require a new class of radio systems capable of transmitting/receiving data/energy and able to adaptively change characteristics of radiated electromagnetic field. An important component of such systems are steerable antenna arrays, which find their application in data transmission systems such as 5G (28 giga hertz (GHz)), WiGig (60 GHz), Beyond 5G (60 GHz), 6G (subTHz), long distance wireless power transmission systems (LWPTS), Long-distance wireless power transmission (LWPT) (24 GHz), automotive radar systems (24 GHz, 79 GHz), etc.

Basic requirements to mm-wave antenna arrays used in the above fields include:

- low losses and high gain;
- ability of flexible steering of beam (direction of maximum radiation), i.e. beam scanning and focusing of radiated field in wide range of angles;
- operation in a wide frequency range;
- compact, inexpensive, simple architecture suitable for mass production.

To date, printed circuit board (PCB) technique is widely used in designing mm-wave radiators, since this technique permits the production of devices simple in design and easy to manufacture, convenient to be implemented on a single substrate with other electronic components, and capable of achieving a wide band of operating frequencies.

Printed antenna array is an array of patch antennas (printed antenna elements).

Existing mm-wave antenna technologies have a number of limitations that significantly affect their applicability:

- small distance between feed ports of antenna elements;
- propagation of surface waves in the antenna PCB;
- considerable falling of gain at great scan angles;
- need to adapt to Antenna-in-package (AiP) technology;
- extremely stringent requirements for manufacturing accuracy, etc.

When used in communication systems, the basic requirements to an antenna array as part of a base station are full circular (360 degrees) scanning of beam in azimuth and work with double polarization. This scanning sector is achieved by combining several antenna arrays with a limited scanning sector. The number of arrays required for the base station may be determined by the scanning range of individual arrays used. Thus, if the scanning sector of the antenna array is limited to +45 degrees, which is typical for antenna arrays currently used in base stations, then four arrays are required to provide full circular (360 degrees) beam scanning. With a scan sector extended to +60 degrees, only three arrays are required for the array. Thus, an increase in the scanning sector of a single antenna array can lead to a decrease in the required number of antenna arrays to provide a specified scan angle and, accordingly, reduce the complexity of antenna array control.

One of basic drawbacks of existing dual polarized antenna arrays is the coupling effect of feed ports of the antenna elements on each other (cross-polarization coupling between cross-polarization feed ports of different polarization in one antenna element and in adjacent antenna elements, as well as co-polarization coupling between feed ports of the same polarization in adjacent antenna elements).

This effect is associated with propagation of parasitic surface waves between array elements in the PCB substrate and above its surface and leaky waves above the antenna array, their addition at the sites of feed elements, which leads to mismatching the antenna elements or, in the case of dual polarized arrays, power flow into cross-polarization ports.

Dual polarized antenna elements have an asymmetric structure, which can worsen these effects. At the stage of designing antenna arrays, this also manifests itself in asymmetric radiation pattern of individual antenna element in the entire array and resulting asymmetry in scanning characteristics.

Conventional patch (printed antenna element) of a dual polarized antenna array with Probe or L-probe excitation is a patch placed above the ground layer and coupled via microstrip transmission lines to two feed ports designed to excite fields with different polarization (for example, vertical and horizontal). Feeding the feedlines through the ground layer is performed via a through-layer using a plated through hole (VIA). To prevent earth fault currents, a ring gap is formed around the VIA. The VIA is connected to an extension of a feedline located on the other PCB layer. The antenna element is surrounded by a plurality of VIAs forming "cavity walls" to reduce coupling effect of adjacent antenna elements. Due to manufacturing limitations, the gaps around the feeding VIA have a size close to the half of wavelength that is the size of radiative ring slot. Due to this, when scanning, surface waves in the PCB excite the ring slot in the other feed port. Two vertical VIA probes work like two vertical coupled monopoles which are unbalanced due to difference in z-oriented currents. So, there are two radiation sources that are non-compensated. This situation is worst by usage, around the antenna element, of multiple VIAs forming "cavity sidewalls," which are needed to reduce coupling between adjacent array elements. Moreover, the cavity also acts as an open resonator for excited parasitic electromagnetic fields in the slots. Cavity sidewalls can block only parasitic waves propagating in dielectric PCB substrate. Parasitic surface and leaky waves are still present in the antenna array. Therefore, cross-polarization coupling between antenna array elements is still high and asymmetrical due to different distance between port and neighboring cross-polarization ports.

This causes undesirable falling of gain of the array element at a certain radiation angle relative to the normal, asymmetric radiation pattern of individual antenna array element and the entire array, and a decrease in the operating frequency range. As a result, gain unduly falls at wide scan angles (greater than 50 degrees). At the same time, it should be noted that when beam is deflected by an angle greater 45 degrees, the array gain falls significantly in one of the two scanning directions, precisely due to the asymmetry of radiation pattern of individual antenna array element.

To overcome the above problems, antenna array should observe the following criteria:

high symmetry of antenna array elements;

high orthogonality of electromagnetic fields of working polarizations in the antenna array element;

no conditions for parasitic surface and leaky waves propagation between antenna array elements.

A proposed solution is disclosed by D. Dogan, "A wide band, dual polarized patch antenna for wide angle scanning phased arrays," 2013 Institute of Electrical and Electronics Engineers (IEEE) International Symposium on Phased Array Systems and Technology, 2013, p. 135-138. The article discloses an antenna element implemented on a multilayer PCB, comprising two stacked patches excited by two straight slots crossed at right angles and disposed on the layer below the patches. The slots, in turn, are excited by two microstrip U slot feed elements placed orthogonally to each other, each on own layer, below the slot elements. However, this antenna has a complex structure due to the use of multilayer feeding structure and the need for matching it.

Patent CN 210245710 U discloses a multilayer antenna, which comprises a radiation patch area isolation cavity surrounded by metal via holes, a support area isolation cavity surrounded by metal plates, and a feed area isolation cavity surrounded by metal via holes from top to bottom in sequence; the top of the isolation cavity of the radiation patch area is provided with a double-layer radiation patch, and the adjacent joint of the isolation cavity of the support area and the isolation cavity of the feed area is provided with a single-layer radiation patch; the feed area isolation cavity is internally provided with a coupling structure and a feed structure from top to bottom in sequence; the feeding structure is used for inducing an electromagnetic field into the coupling structure and carrying out coupling feeding on the double-layer radiating patch and the single-layer radiating patch. However, the antenna uses complex metal cavity between the top and bottom, which makes the antenna element design and assembly more complicated. In addition, this antenna element has asymmetrical feedline structure, which can lead to an asymmetric antenna radiation pattern.

Thus, there is a need for a simple and inexpensive steerable antenna structure with wide beam scan angle, low loss, compact size, and high gain.

The above information is presented as background information only to assist with an understanding of the disclosure. No determination has been made, and no assertion is made, as to whether any of the above might be applicable as prior art with regard to the disclosure.

SUMMARY OF THE INVENTION

Aspects of the disclosure are to address at least the above-mentioned problems and/or disadvantages and to provide at least the advantages described below. Accordingly, an aspect of the disclosure is to provide an antenna array element with dual polarization.

Additional aspects will be set forth in part in the description which follows and, in part, will be apparent from the description, or may be learned by practice of the presented embodiments.

In accordance with an aspect of the disclosure, an antenna array element with dual polarization is provided. The antenna array element includes a multilayer printed circuit board (PCB), a first patch placed on an inner layer of the multilayer PCB, a second patch placed on an upper layer of the multilayer PCB and coupled by electromagnetic field with the first patch, two U slots placed orthogonally on the multilayer PCB layer under the first patch, feedlines placed on one PCB layer under the U slots orthogonally to each other and configured to excite the U slots, a plurality of electromagnetic band gap (EBG) elements located in a boundary area of the antenna array element.

The first patch, the second patch, the U slots and feedlines may be rotated with respect to sides of the antenna array element by 45 degrees around a normal to a plane of the antenna array element.

The multilayer PCB may comprise at least one intermediate layer placed between the inner layer, on which the first patch is placed, and the upper layer, on which the second patch is placed.

Each of the first patch and the second patch may have a shape symmetrical with respect to polarization planes of the antenna array element.

Each of the plurality of EBG elements may comprise a plurality of conductive pads located one above the other on different layers of the multilayer PCB and coupled via a plated through hole (VIA) to a ground layer.

Decoupling VIAs may be placed around the feedlines to suppress spurious radiation from the feedlines.

The plurality of EBG elements are arranged in a single row on a perimeter of the antenna array element.

In accordance with an aspect of the disclosure, an antenna array including a plurality of antenna array elements is provided. The antenna array element of the plurality of antenna array elements includes a first patch placed on an inner layer of the multilayer PCB, a second patch placed on an upper layer of the multilayer PCB and coupled by electromagnetic field with the first patch, two U slots placed orthogonally on the multilayer PCB layer under the first patch, feedlines placed on one PCB layer under the U slots orthogonally to each other and configured to excite the U slots, a plurality of electromagnetic band gap (EBG) elements located in a boundary area of the antenna array element.

The antenna array may further comprise a dielectric sheet is placed above at least one of the plurality of antenna array elements at distance $h<\lambda/4$, where $\lambda$ is a wavelength of signal radiated or received by the antenna array.

The dielectric sheet may be a metasurface.

The metasurface may represent a perforated dielectric sheet.

In accordance with an aspect of the disclosure, an electronic device comprising an antenna array including a plurality of antenna array elements is provided. An antenna array element of the plurality of antenna array elements includes a first patch placed on an inner layer of the multilayer PCB, a second patch placed on an upper layer of the multilayer PCB and coupled by electromagnetic field with the first patch, two U slots placed orthogonally on the multilayer PCB layer under the first patch, feedlines placed on one PCB layer under the U slots orthogonally to each other and configured to excite the U slots, a plurality of electromagnetic band gap (EBG) elements located in a boundary area of the antenna array element.

The disclosure provides a steerable antenna array with simple architecture, high efficiency, low losses, compact size, high gain, capable of focusing/scanning the beam in a wide range of scanning angles, and operating in a wide frequency range.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

Figure 1:
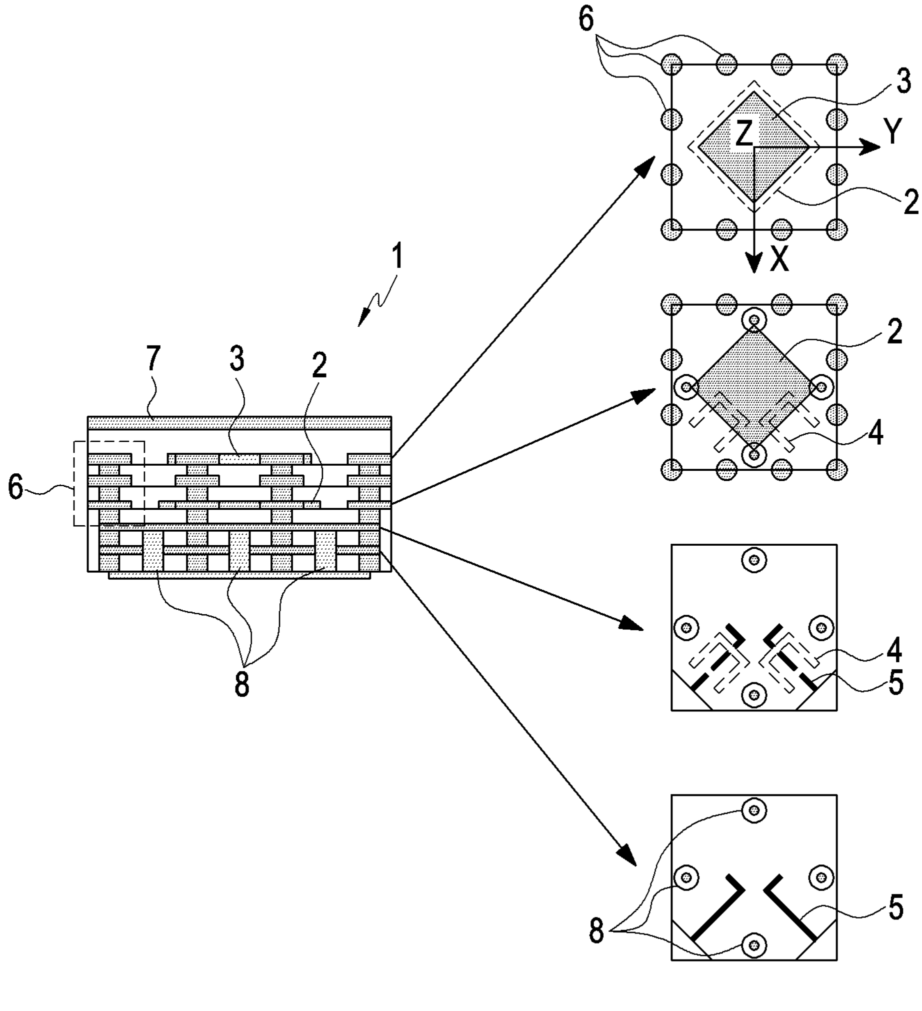
FIG. 1 shows an antenna array element, where the left side of FIG. 1 is a side cross-sectional view of the antenna array element, and the right side of FIG. 1 is a plan view of individual layers of the antenna array element; on the plan view images of layers of the antenna array element, dotted lines show elements placed on the layer below the depicted layer according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before undertaking the detailed description below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, denotes to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" denotes any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, denotes that different combinations of one or more of the listed items may be used, and only one item in the list may be needed. For example, "at least one of: A, B, and C" includes any of the following combinations: A, B, C, A and B, A and C, B and C, and A and B and C.

It should be understood that although the terms such as "first," "second," "third" and the like may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, a first element, component, region, layer, or section may be referred to as a second element, component, region, layer, or section without departing from the scope of the disclosure. As used herein, the term "and/or" includes any and all combinations of one or more of the respective listed positions. Elements mentioned in the singular do not exclude the plurality thereof, unless otherwise specified.

In accordance with an embodiment, the disclosure provides a dual polarized antenna array implemented on a multilayer printed circuit board (PCB); each antenna array element (1) (see FIG. 1) comprises a multi-level (stacked) patch element (patch antenna) consisting of two patches: a primary patch (2) (in other word, a first patch) placed on the PCB inner layer, and a secondary patch (3) (in other word, a second patch) coupled with it and placed on the PCB upper layer; two U slots (4) placed orthogonally to each other below the primary patch (2) and excited by feedlines (5) located under said U slots (4). Furthermore, the antenna array element in accordance with the disclosure includes multiple EBG elements (6) arranged in a single row in the boundary area of the antenna array element, and a dielectric sheet (7) is placed above the antenna array element.

In this context, the phrase "in the boundary area" includes, regardless of the shape of EBG elements, the possibility of their location both near the boundary of the antenna element and directly on the boundary (on the perimeter) of the antenna element.

Hereinafter, antenna array elements in accordance with the disclosure will be described in more detail.

FIG. 1 shows an antenna array element, where the left side of FIG. 1 is a side cross-sectional view of the antenna array element, and the right side of FIG. 1 is a plan view of individual layers of the antenna array element; on the plan view images of layers of the antenna array element, dotted lines show elements placed on the layer below the depicted layer according to an embodiment of the disclosure.

In accordance with the embodiment of the disclosure (see FIG. 1), the antenna array element (1) is square. The antenna array element (1) is formed on a multilayer PCB. Each antenna array element (1) comprises a stacked patch element consisting of two patches: a primary patch (2) (in other word, a first patch) placed on the PCB inner layer, and a secondary patch (3) (in other word, a second patch) coupled with it and placed on the PCB upper layer. Below the primary patch (2), two U slots (4) are placed orthogonally to each other, each excited by a feedline (5) located under said U slot (4). The U slots (4) are used to excite the primary patch (2) placed on the PCB inner layer above said U slots (4), which in turn is coupled by electromagnetic field with the secondary patch (3) placed on the PCB upper layer and designed to radiate a certain polarization when feeding through one of the feedlines (5). The feedlines (5) for exciting the U slots (4) are placed on one PCB layer orthogonally to each other. In an embodiment, the feedline (5) is a symmetrical strip line. The placement of feedlines (5) on one PCB layer ensures compact and simple design of the antenna array element.

Referring to FIG. 1, an intermediate PCB layer is provided between the inner layer, on which the primary patch is placed, and the upper layer, on which the secondary patch is placed. In the general case, there may be no intermediate layers or there may be several. The height between the primary and secondary patches determines the bandwidth of the antenna element, i.e. if the number of available layers in the PCB allows increasing the distance, the operating bandwidth of the device is expanded.

The two U slots (4) are placed symmetrically to one of planes of the antenna array element (for example, XZ plane). Each slot (4) is excited by a feedline (5) located under the slot (4). Each U slot (4) excites electromagnetic currents in the primary patch (2) on the PCB inner layer, which is coupled with the secondary patch (3) on the PCB upper layer. Currents induced in the patches form electromagnetic fields of corresponding polarization. The feedlines (5) have the same shape and are also placed symmetrically to the same plane of symmetry (XZ) of the antenna array element. In the embodiment of FIG. 1, the feedlines are shown as L-shaped elements. The main requirement for feedlines is that they should not cross and all elements of the bends should be orthogonal to each other. There may be more than one bend if required for customization and compactness of the feedlines. Cross-polarization feedlines must be identical, but mirrored— this is required to ensure orthogonality of the excited electromagnetic fields.

Decoupling VIAs (8) are provided around the feedlines (5) in the plane where said feedlines are located, and symmetrically with respect to the above plane of symmetry, to suppress parasitic radiation of the feedline per se.

High symmetry of the antenna element configuration provides high symmetry and orthogonality of electromagnetic fields in the antenna element. This field symmetry is maintained even when antenna scanning. The decoupling VIAs (8) block parasitic waves in the PCB layers where feedlines (5) are located, thereby reducing coupling effect of the antenna array elements. Thus, the aperture excitation, i.e. using slots, in the disclosure does not require transient VIAs for excitation of patches (2, 3), and this minimizes parasitic effects, especially when scanning, and provides simple configuration of antenna element.

In the above embodiment, patches are square, although the patch can be of any shape that is symmetric relative to the plane of polarization (in the case of dual polarization, the patch must be symmetric relative to both planes).

Secondary patch (3) on the PCB upper layer is placed similarly to the primary patch (2) on the PCB inner layer and is excited by electromagnetic coupling with the primary patch (2) on the PCB inner layer.

Corners of the square patch can be rounded or cut to make it compact.

Antenna array element (1) according to the embodiment of the disclosure is surrounded on the perimeter by a single row of EBG elements (6) forming Electromagnetic Band Gap (EBG) structure forming an area across which electromagnetic waves of a certain frequency range cannot propagate), which blocks electromagnetic waves from propagation (leakage) at required frequencies from the antenna array element along its surface due to the formation of a blockage area (band gap) in the operating frequency range.

Figure 2:
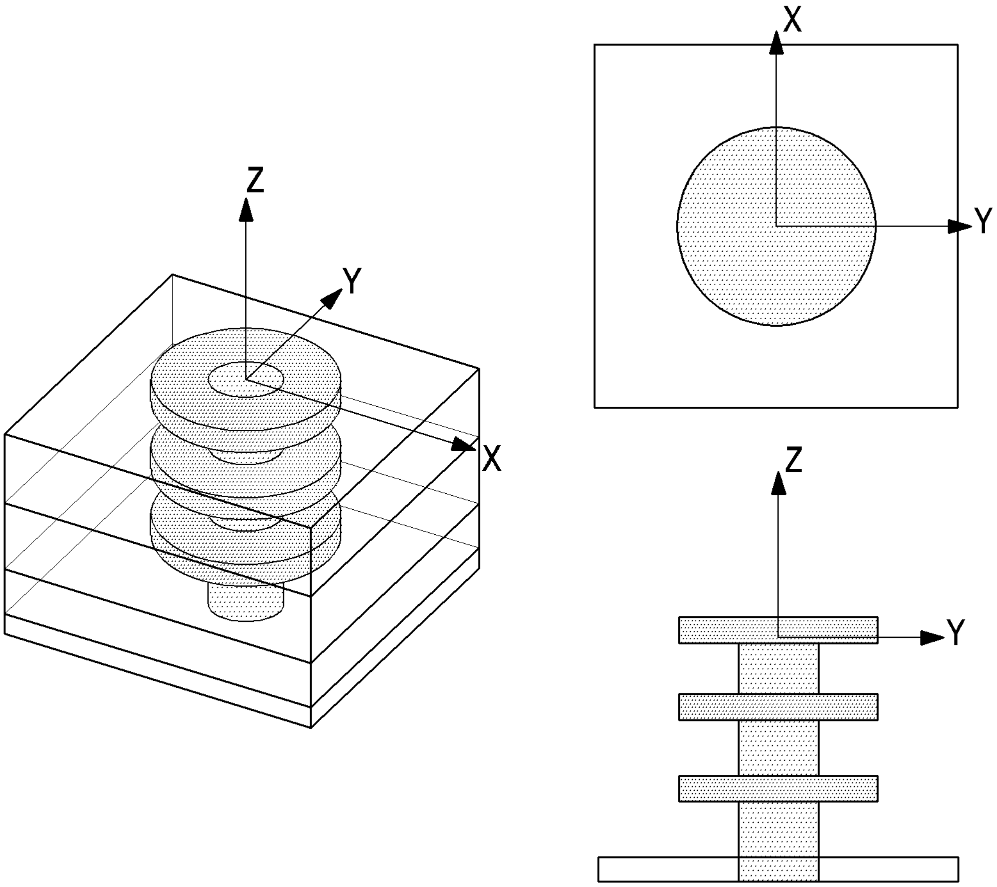
FIG. 2 shows an embodiment of an EBG element (general view, plan view, and side view) according to an embodiment of the disclosure.

FIG. 2 shows an EBG element (general view, plan view, and side view) according to an embodiment of the disclosure.

The placement of EBG elements in single row allows blocking the surface and leaky wave component propagating along this row. However, the leaky wave component propagating across the EBG elements row is not blocked. Nevertheless, even a single row of EBG elements has a significant effect on blocking the spurious surface and leaky waves, which can significantly reduce coupling effect of adjacent antenna array elements. This ensures stable matching of antenna array elements even at significant scan angles, wide operating wavelength range, and a symmetrical radiation pattern.

EBG element is a small conductive area (pad) with VIA (plated through-hole via) coupled to the ground plane in the center. Generally, the EBG elements are mushroom-shaped, i.e. consist of a conductive pad ("mushroom cap") and a cylinder-shaped base ("mushroom leg") connecting the conductive pad and the ground layer of the PCB. In the PCB, the EBG element base is formed by VIA. Depending on the embodiment, the pad may be round, square, rectangular, triangular, hexagonal, etc. Dimensions and shape of the pad influence the equivalent capacitance according to the equivalent circuit of the EBG element defining the bandgap range and are chosen according to the requirements of particular application.

Distance between EBG elements is determined by the size of selected EBG element cell. For convenience, it can be chosen as the antenna element cell size divided by an integer number of EBG elements. Next, the EBG element configuration is calculated for this selected cell size and to provide the required bandgap in the frequency range. In other words, the number of EBG elements within one antenna array element is determined based on technological and design requirements. When choosing the size of EBG cell, technical PCB manufacture limitations on the diameter of VIAs and the diameter of conductive pads around them should be also taken into account.

Figure 3:
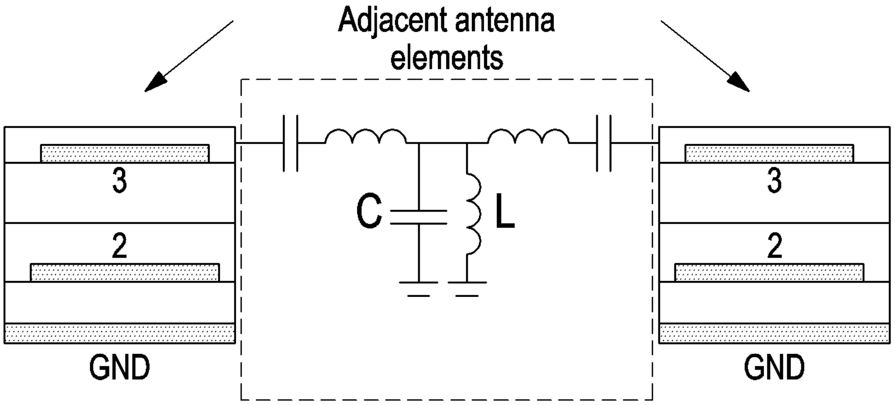
FIG. 3 shows equivalent circuit of an EBG element placed between two adjacent antenna elements according to an embodiment of the disclosure.

FIG. 3 shows equivalent circuit of an EBG element placed between two adjacent antenna elements according to an embodiment of the disclosure.

Referring to FIGS. 1 and 2, EBG elements (6) have multiple pads stacked on top of each other and coupled via VIAs. The number of pads affects the equivalent capacitance C of the EBG element and is primarily determined by the condition for bandgap formation. Maximum number of pads is limited by the available PCB layers. The VIA height and diameter mainly affect the equivalent inductance L of the EBG element. The multiple-pad configuration can reduce the EBG element size, which is necessary to accommodate them in the antenna array element without interfering with excitation slots and patches. As a consequence, parasitic influence on the antenna element is eliminated and isolation between feed ports is improved.

In an alternative embodiment, an EBG element with a single conductive pad can be used. This embodiment is simpler to manufacture, but still narrowband.

Figure 4:
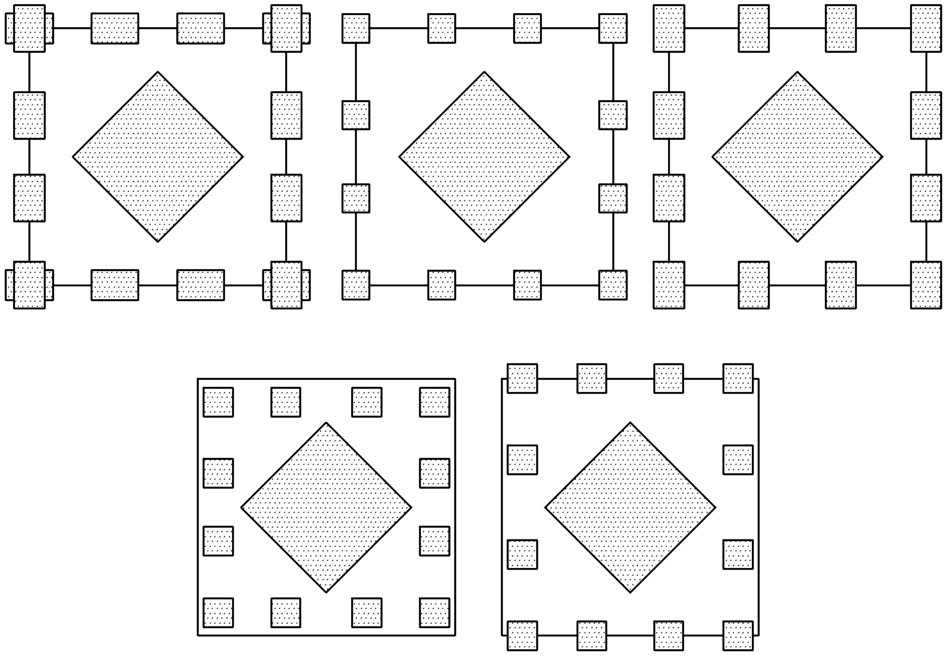
FIG. 4 shows options of placement of EBG elements of various shapes in the boundary area of antenna array element according to an embodiment of the disclosure.

FIG. 4 shows options of placement of EBG elements of various shapes in the boundary area of antenna array element according to an embodiment of the disclosure. Various options are possible for placement of EBG elements with conductive pads of various shapes in the boundary area of the antenna array element. The first three examples shown in FIG. 4 illustrate embodiments of antenna array elements in which EBG elements located on the perimeter of the antenna array element are common EBG elements with adjacent antenna array elements, i.e. only a single row of EBG elements is provided between adjacent antenna array elements. On the other hand, the last two examples in FIG. 4 depict embodiments in which some EBG elements in the boundary area of the antenna array element are completely placed within said antenna array element. Therefore, EBG elements can be arranged similarly in adjacent antenna array elements. As a result, two rows of EBG elements can be placed between adjacent array elements, which can improve antenna array scanning performance by further reduction in coupling between the array elements. Moreover, to achieve maximum decoupling improvement, geometric parameters of the cell (i.e. the distance between EBG elements) should be also observed in the second direction, where two rows of elements are located.

The antenna array according to the disclosure includes a dielectric sheet (7) placed above each antenna array element (1). The dielectric sheet (7) is placed in near field of the antenna element, and the height of the gap between the antenna array and the dielectric sheet is $h<\lambda/4$ ($\lambda$ is the wavelength of signal radiated/received by the antenna array in free space). Thus, propagation of surface waves is additionally suppressed by changing loading conditions of the antenna array element (1) for reduction of coupling coefficients. Dielectric sheet (7) can increase parallel capacitance for EBG elements (6), additionally improving the blockage effect on surface and leaky waves above the antenna PCB.

Gap between the antenna array and the dielectric sheet can be maintained by dielectric spacers.

In one embodiment, the dielectric sheet is a metasurface. In this context, metasurface represents a perforated dielectric sheet (7) for providing a required dielectric permittivity. Multiple holes in the perforated dielectric sheet (7) have a periodic pattern, for example, are made above corners of each antenna array element. This metasurface is simple in design and manufacture. However, when diameter of the holes is less than $\lambda_\varepsilon/4$, location of the holes becomes unimportant. Provision of holes in the dielectric sheet (7) makes it possible to obtain a required dielectric permittivity of the dielectric sheet (7), which is infeasible for a solid dielectric. Varying the dielectric permittivity of dielectric sheet (7) above the antenna array, it is possible to achieve a significant reduction in coupling coefficient between feed ports even when scanning. Other embodiments of metasurface are also possible, depending on the required parameters of the antenna array.

Mathematical modeling performed for an embodiment of the disclosure showed that a dielectric sheet with dielectric permittivity $\varepsilon$ in the range of 1.5 . . . 3.2 can significantly reduce propagation of surface and leaky waves over the antenna PCB. However, for other embodiments of the antenna array in accordance with the disclosure (using other materials and having a modified configuration), the optimal dielectric permittivity value may be different.

Dielectric sheet (7) can additionally be used as a protective layer (radome).

Referring to FIG. 1, in an embodiment of the disclosure, patches (2, 3) (as well as U slots and feedlines) are rotated with respect to the sides of the antenna array element (1) by 45 degrees around the normal to the plane of the antenna array element. Due to this, the antenna array scanning is carried out in D-plane of the antenna array element, in which the shape of the antenna array element radiation pattern is substantially the same for both polarizations as an intermediate section of the element pattern.

Figure 5:
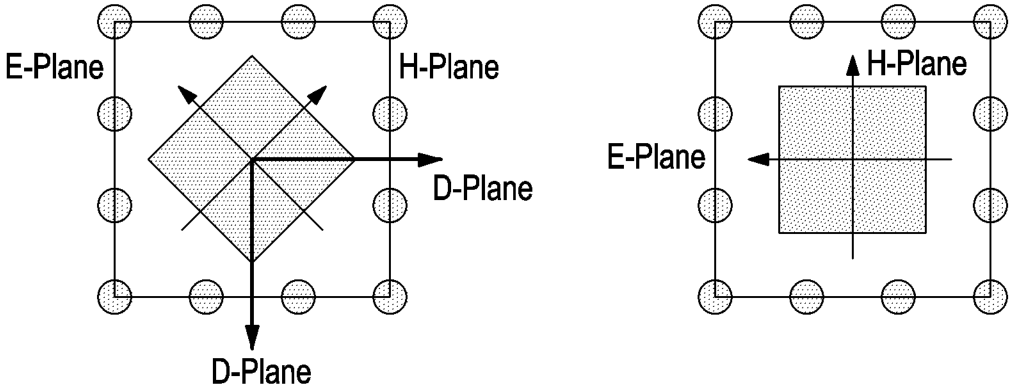
FIG. 5 is a plan view of one antenna array element with indication of scanning planes according to an embodiment of the disclosure.

FIG. 5 is a plan view of one antenna array element with indication of scanning planes according to an embodiment of the disclosure. Generally, the antenna element has different shapes of the radiation pattern in E- and H-planes, i.e. the arrangement of the element without rotation gives different radiation patterns for each of the antenna ports. In D-plane, radiation patterns of different ports, for this case, are mirror symmetrical ($D1(\theta)=D2(-\theta)$) and close to symmetrical in the case of low power leakage between the ports over the entire scanning range. As a result, when designing an antenna element and an array, it is sufficient to optimize its geometry in one plane (in the second plane the simulation results will be the same due to the symmetry of radiation characteristics in D-plane). This also simplifies the array control, since it will be possible to apply the same phase distribution to the array elements for scanning in both polarizations.

However, the disclosure can increase the radiation pattern symmetry in E- and H-planes even in an alternative embodiment of the disclosure (see FIG. 5 on the right), where no rotation of patches relative to the sides of the antenna array element is provided. In existing solutions, said characteristics worsen at great scan angles due to surface waves, which are the main cause of problems in dual polarized antenna arrays. However, owing to the high symmetry of elements, absence of uncompensated elements in the structure, and blockage of surface and leaky waves, the disclosure effectively overcomes the above problems.

The antenna array element configuration can also be used for designing scanning antenna arrays operating with single polarization. Then, the antenna array element structurally differs from the above embodiment only by the number of patch exciting elements, i.e. the antenna array element comprises only one U slot and one feedline. Thus, the antenna array element in accordance with this embodiment includes: a multilayer PCB; a primary patch placed on the PCB inner layer; a secondary patch placed on the PCB upper layer and coupled by electromagnetic field with the primary patch; an U slot placed under the primary patch; a feedline placed under said U slot and adapted to excite said U slot; decoupling VIAs for suppressing spurious radiation from the feedline, and multiple electromagnetic band gap (EBG) elements located in the boundary area of the antenna array element. The antenna array element will work with only one linear polarization. EBG elements will also block surface and leaky waves and thereby reduce coupling between elements of the array and improve its scanning performance.

The following describes operation of the antenna array in accordance with an embodiment of the disclosure.

High-frequency signal is fed from a generator to working polarization feedline (5) of antenna array element (1). The input signal is defined by amplitude and phase. Generally, amplitude of signals on all array elements should be the same. The signal phase determines position of antenna beam in space.

U slots (4), excited by electromagnetic field of the supplied feedline (5), induce currents in primary patch (2) placed on the PCB inner layer. Size and shape of the primary patch (2) are resonant to the applied frequency signal. The primary patch (2) on the PCB inner layer is coupled by electromagnetic field with secondary patch (3) placed on the PCB upper layer. Size and shape of the secondary patch (3) are resonant to the applied frequency signal. The secondary patch (3) on the PCB upper layer generates electromagnetic field of a certain polarization. High symmetry of the antenna array element (1) configuration provides a high symmetry and orthogonality of electromagnetic fields in the antenna element for both polarizations (in the case of a dual polarized antenna array) even when antenna scanning.

EBG elements (6) located in the boundary area of the antenna array element (1) block propagation of electromagnetic waves in the PCB substrate and above the antenna array. As a result, the antenna array elements have low co- and cross-polarization coupling with adjacent elements.

Metasurface representing a thin dielectric sheet of a specified dielectric permittivity additionally reduces coupling between adjacent antenna elements.

Electromagnetic field excited by each stacked patch of the antenna array is added in the array far zone, which results, at a certain distribution of phases of signals applied to the elements, in more directional radiation of the array, and an antenna beam is formed. By controlling the applied signal phase, position of the beam in space is steered and antenna scanning is performed. The disclosure can reduce coupling between adjacent antenna array elements and between ports of different polarization within the same element, thereby expanding the scanning capabilities.

Therefore, the disclosure expands the scanning range and operating frequency band of the antenna array, improves its performance and reduces losses. At the same time, the antenna array according to the disclosure is compact and has simple and inexpensive architecture applicable for mass production.

The antenna array according to the disclosure is Antenna-in-Package (AiP) compatible.

The antenna array according to the disclosure is intended to be used in the mm-wave range. However, any wavelength ranges in which radiation and controlled directivity of electromagnetic waves are possible can be used alternatively. For example, shortwave, sub-millimeter (terahertz) radiation, etc. can be used as an alternative.

The disclosure includes a various types of electronic devices including the antenna array described above.

Compact and high performance steerable antenna array systems according to the disclosure may find application in the emerging 5G, 6G and WiGig wireless communication systems. Furthermore, the disclosure can be used in both base stations and antennas of mobile terminals. In this case, the base station implements time division beam control between users. In so doing, the antenna beam maximum of the user terminal is deflected to the position of the base station antenna.

The disclosure can find application in all types of LWPT systems: outdoor/indoor, automotive, mobile, etc. It ensures high power transmission efficiency in all scenarios. A power transmission device can be constructed on the basis of the disclosed antenna array structure and thus can implement beam focusing while charging devices in the near field or beam scanning to transmit power to the devices located in the far field of the transmitter antenna.

In robotics, the antenna can be used to detect/avoid obstacles.

The disclosure is also applicable in autonomous vehicle radars.

Functionality of an element specified in the description or claims as a single element may be practiced via several components of the device, and conversely, functionality of elements indicated in the description or claims as several separate elements may be practiced via a single component.

Embodiments of the disclosure are not limited to the embodiments described herein. Other embodiments of the disclosure that do not go beyond the idea and scope of this disclosure will be apparent to those skilled in the art on the basis of the information set forth in the description and knowledge of technology.

Elements mentioned in the singular do not exclude the plurality of elements, unless otherwise specified.

Those skilled in the art should appreciate that the essence of the disclosure is not limited to a particular software or hardware, and therefore any existing software and hardware can be used for implementing the disclosure. For example, hardware may be implemented in one or more ASICs, digital signal processors, digital signal processing devices, programmable logic devices, field-programmable gate arrays, processors, controllers, microcontrollers, microprocessors, electronic devices, other electronic units configured to perform the functions described in this disclosure, a computer or a combination thereof.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna array element with dual polarization, comprising:

a multilayer printed circuit board (PCB);

a first patch placed on an inner layer of the multilayer PCB;

a second patch placed on an upper layer of the multilayer PCB and coupled by electromagnetic field with the first patch;

two U slots placed orthogonally on the multilayer PCB under the first patch, wherein each of the U slots includes a first line part, a second line part placed parallel to the first line part, and a third line part connecting the first line part and the second line part, and each of the first line part, the second line part, and the third line part is tilted by 45 degrees with respect to at least one side of the antenna array element;

feedlines placed on one PCB layer under the U slots orthogonally to each other and configured to excite the U slots;

a plurality of electromagnetic band gap (EBG) elements located in a boundary area of the antenna array element; and a plurality of decoupling plated through holes (VIAs) located symmetrically according to symmetry of the antenna array element, around the feedlines.

2. The antenna array element of claim 1, wherein the first patch, the second patch, the U slots and the feedlines are rotated with respect to sides of the antenna array element by 45 degrees around a normal to a plane of the antenna array element.

3. The antenna array element of claim 1, wherein the multilayer PCB comprises at least one intermediate layer placed between the inner layer, on which the first patch is placed, and the upper layer, on which the second patch is placed.

4. The antenna array element of claim 1, wherein each of the first patch and the second patch has a shape symmetrical with respect to polarization planes of the antenna array element.

5. The antenna array element of claim 1, wherein each of the plurality of EBG elements comprises a plurality of conductive pads located one above the other on different layers of the multilayer PCB and coupled via a plated through hole to a ground layer.

6. The antenna array element of claim 1, wherein the plurality of EBG elements are arranged in a single row on a perimeter of the antenna array element.

7. An antenna array including a plurality of antenna array elements, wherein an antenna array element of the plurality of antenna array elements comprises:

a multilayer printed circuit board (PCB);

a first patch placed on an inner layer of the multilayer PCB;

a second patch placed on an upper layer of the multilayer PCB and coupled by electromagnetic field with the first patch;

two U slots placed orthogonally on the multilayer PCB under the first patch, wherein each of the U slots includes a first line part, a second line part placed parallel to the first line part, and a third line part connecting the first line part and the second line part, and each of the first line part, the second line part, and the third line part is tilted by 45 degrees with respect to at least one side of the antenna array element;

feedlines placed on one PCB layer under the U slots orthogonally to each other and configured to excite the U slots;

a plurality of electromagnetic band gap (EBG) elements located in a boundary area of the antenna array element; and a plurality of decoupling plated through holes (VIAs) located symmetrically according to symmetry of the antenna array element, around the feedlines.

8. The antenna array of claim 7, wherein the first patch, the second patch, the U slots and the feedlines are rotated with respect to sides of the antenna array element by 45 degrees around a normal to a plane of the antenna array element.

9. The antenna array of claim 7, wherein the multilayer PCB comprises at least one intermediate layer placed between the inner layer, on which the first patch is placed, and the upper layer, on which the second patch is placed.

10. The antenna array of claim 7, wherein each of the first patch and the second patch has a shape symmetrical with respect to polarization planes of the antenna array element.

11. The antenna array of claim 7, wherein each of the plurality of EBG elements comprises a plurality of conductive pads located one above the other on different layers of the multilayer PCB and coupled via a plated through hole to a ground layer.

12. The antenna array of claim 7, wherein the plurality of EBG elements are arranged in a single row on a perimeter of the antenna array element.

13. The antenna array of claim 7, further comprising:

a dielectric sheet placed above at least one of the plurality of antenna array elements at distance $h<\lambda/4$, where $\lambda$ is a wavelength of signal radiated or received by the antenna array.

14. The antenna array of claim 13, wherein the dielectric sheet is a metasurface.

15. The antenna array of claim 14, wherein the metasurface comprises a perforated dielectric sheet.

16. An electronic device comprising an antenna array including a plurality of antenna array elements, wherein an antenna array element of the plurality of antenna array elements comprises:

a multilayer printed circuit board (PCB);

a first patch placed on an inner layer of the multilayer PCB;

a second patch placed on an upper layer of the multilayer PCB and coupled by electromagnetic field with the first patch;

two U slots placed orthogonally on the multilayer PCB under the first patch, wherein each of the U slots includes a first line part, a second line part placed parallel to the first line part, and a third line part connecting the first line part and the second line part, and each of the first line part, the second line part, and the third line part is tilted by 45 degrees with respect to at least one side of the antenna array element;

feedlines placed on one PCB layer under the U slots orthogonally to each other and configured to excite the U slots;

a plurality of electromagnetic band gap (EBG) elements located in a boundary area of the antenna array element; and a plurality of decoupling plated through holes (VIAs) located symmetrically according to symmetry of the antenna array element, around the feedlines.

17. The electronic device of claim 16, wherein the feedlines comprise symmetrical strip lines.

18. The electronic device of claim 16, wherein the antenna array further comprises a dielectric sheet placed above at least one of the plurality of antenna array elements at distance $h<\lambda/4$, where $\lambda$ is a wavelength of signal radiated or received by the antenna array.

* * * * *